E. A. JONES.
OPERATING MECHANISM FOR COLLAPSIBLE RIMS FOR WHEELS.
APPLICATION FILED FEB. 26, 1919.
1,325,326. Patented Dec. 16, 1919.
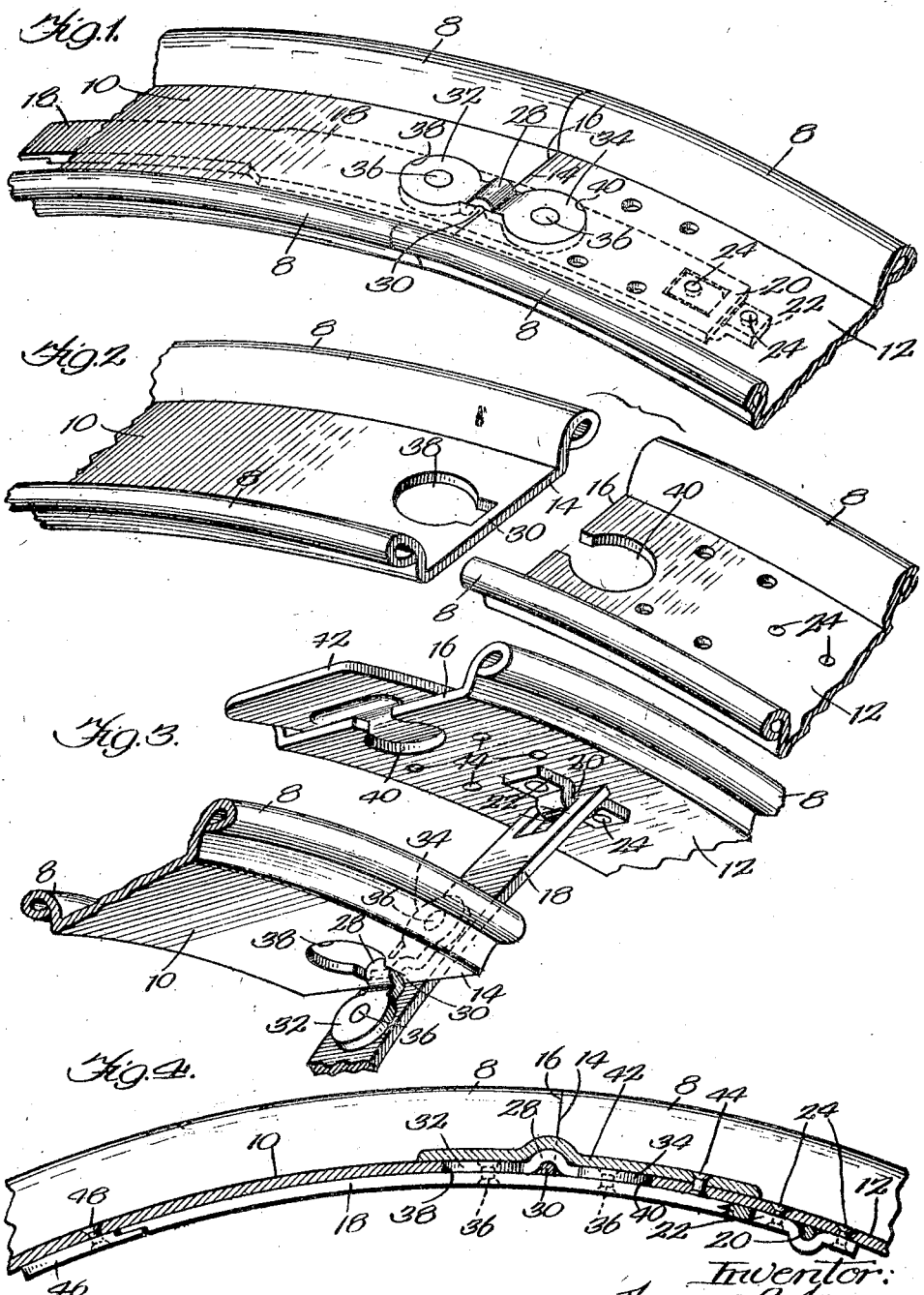
Inventor:
Eugene A. Jones.
By Cheever & Cox Attys

UNITED STATES PATENT OFFICE.

EUGENE A. JONES, OF LOS ANGELES, CALIFORNIA.

OPERATING MECHANISM FOR COLLAPSIBLE RIMS FOR WHEELS.

1,325,326. Specification of Letters Patent. Patented Dec. 16, 1919.

Application filed February 26, 1919. Serial No. 279,237.

*To all whom it may concern:*

Be it known that I, EUGENE A. JONES, a citizen of the United States, residing at Los Angeles, in the county of Los Angeles and State of California, have invented a certain new and useful Improvement in Operating Mechanism for Collapsible Rims for Wheels, of which the following is a specification.

This invention relates to that class of tire rims or tire supports, commonly known as collapsible or demountable rims which are commonly used to carry previously inflated pneumatic tires so that they can be readily applied to and removed from the wheel proper of a vehicle, such as an automobile, without its being necessary to go through the manipulations of inflating the tire at the roadside or other point at which and when it is necessary to change pneumatic tires.

More particularly, the invention relates to the class of collapsible tire rims having two oppositely disposed normally abutting end sections capable of moving one past the other, in combination with a lever more or less permanently pivoted to each of such adjacent end sections of the rim at different distances from such ends, an example of which is shown, described and claimed in my prior application Serial No. 256,663, filed October 30th, 1918.

The object of this invention is to provide a lever, for manipulating the end sections of the rim which is relatively thin so that it lies against the inner side of the rim out of the way when the rim is in normal operative position on a wheel, which is so reinforced, particularly in its middle portion where it engages one of the rim sections, that it is strong enough to properly do its work without giving out under trying conditions of service and in which the reinforcing parts of the lever are let into the rim itself to be out of the way while serving as positioning members to prevent side play of the rim section ends.

The invention consists in mechanism capable of carrying out the foregoing objects, which can be easily and conveniently made, which is satisfactory in operation and is not readily liable to get out of order. More particularly, the invention consists in the features and details of construction which will be hereafter more fully set forth in the specification and claims.

Referring to the drawings, in which like numerals represent the same parts throughout the several views, Figure 1 is a perspective view of the top of a rim having this invention applied thereto, the protecting plate 42 being entirely removed.

Fig. 2 is a perspective view of the rim sections separated one from the other, and all operating parts removed therefrom.

Fig. 3 is a perspective changed position view of the parts of Figs. 1 and 4 as they appear when the tire is removed from the rim.

Fig. 4 is a vertical sectional view through the rim and the operating mechanism therefor in the position which the parts assume when the tire is on the rim.

In carrying out this invention, a metallic tire supporting rim, having the customary side flanges 8 is provided, the same being severed transversely at one point so as to form what will be for the purposes of this case described as two "sections" 10 and 12 irrespective of whether the rim is severed at other points to make true "sections" or not. The respective ends 14 and 16 of these sections abut each other when the rim is in normal position shown in Figs. 1 and 4, and pass each other somewhat when the rim is collapsed as shown in Fig. 2. The mechanism for holding the rim sections in normal position and for swinging them to the position of Fig. 3 consists in a normally relatively thin lever 18 conforming to the curvature of a tire which is to be carried by the rim, this lever being pivoted at one end to rim section 12 at a point remote from its end 16 and being pivoted between its ends to the end 14 of rim section 10. The pivoting of the end of lever 16 to rim section 12 may, so far as the present invention is concerned, be accomplished in any suitable manner. In the particular case here illustrated, it is done by forming integrally with the end of lever 18 a pivot shaft 20 embraced by a clip 22, secured in place by any suitable means, such for instance as rivets 24.

The pivoting of the end 14 of rim section 10 to the lever 18 is accomplished by the mechanism of this invention and consists in providing upon the face of lever 18 which is adjacent to the rim a reinforcing plate or backbone member having a central portion 28 which embraces and pivots upon a cross member 30 formed at the extreme end 14 of rim member 10 and enlarged end members 32 and 34 secured in place on the lever by rivets 36. These end members are made of substantially the thickness of the metal of the rim sections 10 and 12 respectively and are made of sufficient horizontal dimensions so that they strengthen the lever 18 to such an extent that it will stand all strains properly put upon it in manipulating the rim sections from the position of Figs. 1 and 4 to that of Fig. 3, and vice versa. A recess 38 is formed in rim section 10 to receive member 32, and a corresponding recess 40 is formed in rim end 12 to receive member 34, when the rim is in the normal position of Figs. 1 and 4. The backbone member fits sufficiently closely in the recesses shown and described, formed for it in the rim ends so that no substantial side play can take place along the lines 14—16 when the rim is in the normal position of Figs. 1 and 4.

Over the operating mechanism described is normally placed a cover plate 42, secured to one of the rim sections by rivets 44, this cover plate having some special features shown, described and claimed in said prior application.

The lever 18 is preferably locked in normal position by a button or catch 46 pivoted at 48 and operating in the obvious usual manner.

In operation: Assume the parts in normal position of Figs. 1 and 4. The operator turns catch 46 out of the way, grasps lever 18 and swings it to the position of Fig. 3. In this position the inflated tire which was on the rim, not shown in the drawings, can be removed from the rim. Thereafter, at the will of the operator, he swings lever 18 back to normal position and returns latch 46 to the position shown in Fig. 4, whereupon the rim is ready for use. In making this last movement, the reinforcing backbone enters the openings provided for it in the rim sections and in so doing accurately positions and locks the rim ends with reference to each other.

The lever 18 is, when reinforced with the backbone member 28—32—34, sufficiently strong to swing the parts as described under all conditions which are apt to arise on the road and yet the operating mechanism is sufficiently compact so that the parts can assume the position shown in Fig. 4 and thus permit the rim and its attached tire to be readily applied to an ordinary vehicle wheel of commerce which is to be equipped with the pneumatic tire carried by the rim. Were the reinforcing backbone not taken care of within the body of the rim itself, the lever 18 would, in practice, have to be so thick that the rim could not be applied properly to the wheel referred to.

The device of this invention is of special value in view of the fact that a collapsible rim can be made by taking an old non-collapsible rim, severing it transversely at a single point to form the rim sections referred to and punching out the necessary perforations for the application of the previously prepared lever mechanism.

Having thus described the invention, what I claim as new and desire to secure by Letters Patent, is:—

1. In mechanism of the class described, a pair of adjacent abutting rim sections separable one from the other, a bearing member formed transversely of one rim section at substantially its end, there being recesses cut in said rim section adjacent to said bearing member and in the end of the opposite adjacent rim section, an operating lever provided intermediate between its ends with a reinforcing backbone member which enters said recesses and pivots the lever on said bearing member, and means pivoting one end of said lever to the rim section which does not carry said bearing member at a point remote from its end.

2. In mechanism of the class described, a pair of adjacent abutting rim sections separable one from the other, a bearing member formed transversely of one rim section at substantially its end, there being recesses cut in said rim section adjacent to said bearing member and in the end of the opposite adjacent rim section, an operating lever provided intermediate between its ends with a reinforcing backbone member which enters said recesses and pivots the lever on said bearing member, means pivoting one end of said lever to the rim section which does not carry said bearing member at a point remote from its end, and means for detachably securing the other end of said lever to said rim end which does carry said bearing member.

3. In mechanism of the class described, a pair of rim sections normally abutting each other and movable to a position in which the end of one section passes the other, a relatively thin lever member lying along the under side of the rim across the line of abutment of the rim sections without entering the surface of the rim, means pivoting one end of said lever to a rim section at a point somewhat remote from the line of abutment, means intermediate of the ends of said lever pivoting it to the last mentioned rim and adjacent to the line of abutment and separately applied reinforcing means for said lever extending over on each side of said last mentioned pivotal means lying in recesses formed to receive it in the end portions of the rim sections, for the purposes set forth.

In witness whereof I have hereunto subscribed my name in the presence of two witnesses.

EUGENE A. JONES.

Witnesses:
DWIGHT B. CHEEVER,
M. S. ROSENZWEIG.